(12) United States Patent
Sato

(10) Patent No.: US 10,808,771 B2
(45) Date of Patent: Oct. 20, 2020

(54) POWER TRANSMISSION DEVICE

(71) Applicant: NTN CORPORATION, Osaka (JP)

(72) Inventor: Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 12 days.

(21) Appl. No.: 16/332,848

(22) PCT Filed: Sep. 14, 2017

(86) PCT No.: PCT/JP2017/033318
§ 371 (c)(1),
(2) Date: Mar. 13, 2019

(87) PCT Pub. No.: WO2018/052091
PCT Pub. Date: Mar. 22, 2018

(65) Prior Publication Data
US 2019/0211888 A1 Jul. 11, 2019

(30) Foreign Application Priority Data
Sep. 15, 2016 (JP) .................................. 2016-180408

(51) Int. Cl.
*F16D 25/04* (2006.01)
*B60K 23/08* (2006.01)
(Continued)

(52) U.S. Cl.
CPC .......... *F16D 25/048* (2013.01); *B60K 17/344* (2013.01); *B60K 17/348* (2013.01);
(Continued)

(58) Field of Classification Search
CPC ........ F16D 25/04; F16D 25/048; F16D 11/10; F16D 2300/14; B60K 17/344;
(Continued)

(56) References Cited

U.S. PATENT DOCUMENTS 5,871,072 A * 2/1999 Itoh .................... B60K 17/3515
180/247
5,950,785 A * 9/1999 Adachi .............. B60K 17/3515
192/69.41
(Continued)

FOREIGN PATENT DOCUMENTS

| JP | 10-272954 | 10/1998 |
| JP | 10-278621 | 10/1998 |
| JP | 2016-153282 | 8/2016 |

OTHER PUBLICATIONS

International Search Report dated Dec. 12, 2017 in International (PCT) Application No. PCT/JP2017/033318.
(Continued)

*Primary Examiner* — Huan Le
(74) *Attorney, Agent, or Firm* — Wenderoth, Lind & Ponack, L.L.P.

(57) ABSTRACT

A power transmission device includes a selective rotation transmission mechanism for keeping the current drive mode of a vehicle. The selective rotation transmission mechanism includes a magnetized yoke, and a pressure receiving plate opposed to the yoke in the axial direction. In order to improve the stability of operation of the selective rotation transmission mechanism, the yoke and the pressure receiving plate are configured such that separated regions are defined between the yoke and the pressure receiving plate when the latter is attracted to the former such that at the separated regions, the yoke is not in contact with the pressure receiving plate.

8 Claims, 11 Drawing Sheets

(51) Int. Cl.
*F16D 11/10* (2006.01)
*B60K 17/344* (2006.01)
*B60K 17/348* (2006.01)

(52) U.S. Cl.
CPC ............... *B60K 23/08* (2013.01); *F16D 11/10* (2013.01); *F16D 25/04* (2013.01); *B60K 2023/0858* (2013.01); *B60K 2023/0866* (2013.01); *B60K 2023/0891* (2013.01); *F16D 2300/14* (2013.01)

(58) Field of Classification Search
CPC .................. B60K 17/348; B60K 23/08; B60K 2023/0858; B60K 2023/0866; B60K 2023/0891
See application file for complete search history.

(56) References Cited

U.S. PATENT DOCUMENTS 5,967,279 A * 10/1999 Itoh .................... B60K 23/08
180/247
6,039,138 A    3/2000 Sugimoto et al.
6,145,641 A * 11/2000 Adachi ............. B60K 17/3515
192/69.41

OTHER PUBLICATIONS

English translation of International Preliminary Report on Patentability dated Mar. 19, 2019 in International (PCT) Application No. PCT/JP2017/033318.

* cited by examiner

POWER TRANSMISSION DEVICE

TECHNICAL FIELD

The present invention relates to a power transmission device.

BACKGROUND ART

Some vehicles such as automobiles include power transmission devices having a freewheeling function, i.e., capable of switching between the two-wheel drive mode and the four-wheel drive mode (see, for example, JP H10-278621A). The power transmission devices disclosed in JP H10-278621A are configured, during the two-wheel drive mode, to uncouple the auxiliary drive wheels from the auxiliary drive wheel axles so that the travel resistance applied to the auxiliary drive wheels is not transmitted to the auxiliary drive wheel axles, and during the four-wheel drive mode, the power transmission devices lock the auxiliary drive wheels to the auxiliary drive wheel axles to transmit the driving force from the engine to the auxiliary drive wheels.

Power transmission devices are used, for example, in a four-wheel vehicle shown in FIG. 2. This four-wheel vehicle includes a transfer case 5 which can be switched between the two-wheel drive mode and the four-wheel drive mode by actuating a switching mechanism 4 through a transfer case lever 3. During the two-wheel drive mode, driving force is transmitted to the rear wheels 9b, while the switching mechanism 4 blocks transmission of the driving force from the transfer case 5 to a front propeller shaft 6a. During the four-wheel drive mode, the driving force is partially transmitted to the rear wheels 9b, and partially transmitted, from the transfer case 5, to the front wheels 9a through a front propeller shaft 6a, a front differential 7a, and the respective power transmission devices 100.

As shown in FIGS. 11 and 12, each power transmission device 100 includes, as main components, a shaft 101 (which constitutes a front axle 8a of the vehicle) rotated by the driving force from the engine 1 (see FIG. 2); a hub 102 that rotates about the center axis together with the corresponding front wheel 9a (see FIG. 2); and a selective rotation transmission mechanism 13 that selectively allows and blocks transmission of rotation between the shaft 101 and the hub 102. A slide gear 106 is mounted to the shaft 11 so as be axially movable relative to the shaft 101. An outer gear 107 engageable with the slide gear 106 is integral with or fixed to the hub 12 so as to be rotatable about the center axis.

The selective rotation transmission mechanism 13 moves the slide gear 106 into and out of engagement with the outer gear 107, thereby selectively allowing and blocking transmission of rotation between the shaft 101 and the hub 102.

The selective rotation transmission mechanism 103 defines an internal space which is divided by a diaphragm 110 into a two-wheel drive negative pressure chamber 108 and a four-wheel drive negative pressure chamber 109. The two-wheel drive negative pressure chamber 108 is connected to a two-wheel drive negative pressure port 112 through a two-wheel drive negative pressure passage 111, whereas the four-wheel drive negative pressure chamber 109 is connected to a four-wheel drive negative pressure port 114 through a four-wheel drive negative pressure passage 113. A pressure receiving plate 115 made of a magnetic material is disposed on the side of the diaphragm 110 facing the two-wheel drive negative pressure chamber 108, whereas a piston 116 is disposed on the side of the diaphragm 110 facing the four-wheel drive negative pressure chamber 109. The diaphragm 110, the pressure receiving plate 115, and the piston 116 are fixed together by a rivet 117 so that, as the diaphragm 110 moves in the axial direction, the pressure receiving plate 115 and the piston 116 move in the axial direction. The slide gear 106 is attached to the piston 116 so that, as the piston 116 moves in the axial direction, the slide gear 106 moves in the same direction together with the piston 116.

A yoke 118 made of a magnetic material is fixed in position within a cover 104. As shown in FIG. 13, the yoke 118 includes a cylindrical attracting portion 118a protruding from the radially inner edge of the yoke 118 toward the pressure receiving plate 115. The distal end of the attracting portion 118a defines a circumferentially continuous attracting surface so that the attracting portion 118a attracts the pressure receiving plate 115 over the entire attracting surface.

A magnet 119 is disposed close to the yoke 118 to magnetize the yoke 118 (attracting portion 118a). Between the yoke 118 and the pressure receiving plate 115, a coil spring 120 is disposed which is configured to bias the pressure-receiving plate 115 (and thus the diaphragm 110 and the piston 116 too) in the direction away from the yoke 118.

To switch the power transmission device to the two-wheel drive mode (see FIG. 11), during which rotational force cannot be transmitted between the shaft 101 and the hub 102, negative pressure is created in the two-wheel drive negative pressure chamber 108 to move the diaphragm 110 toward the two-wheel drive negative pressure chamber 108 until the slide gear 106 disengages from the outer gear 107. At the same time, as shown in FIG. 13, the pressure receiving plate 115 is attracted to the yoke 118 by the magnetic force of the attracting portion 118a. After switching to the two-wheel drive mode, the two-wheel drive negative pressure chamber 108 is opened to the atmosphere, and the two-wheel drive mode is maintained by the magnetic attraction force of the yoke 118 alone.

To switch the power transmission device to the four-wheel drive mode (see FIG. 12), during which rotational force can be transmitted from the shaft 101 to the hub 102, negative pressure is created in the four-wheel drive negative pressure chamber 109 to move the diaphragm 110 toward the four-wheel drive negative pressure chamber 109 until the slide gear 106 engages the outer gear 107. After switching to the four-wheel drive mode, the four-wheel drive negative pressure chamber 109 is opened to the atmosphere, and the four-wheel drive mode is maintained by the biasing force of the coil spring 120 alone.

Patent Document 1: JP H10-278621A

With the power transmission devices disclosed in JP H10-278621A, the yoke (see for example FIG. 13) is made of a magnetic material so that it is magnetized by the magnet disposed close thereto. Therefore, if its magnetic properties change while it is being formed, it cannot perform its expected function as a yoke. The yoke is therefore formed not by turning but by pressing because pressing is less likely to impact the magnetic properties. However, with pressing, compared with turning, it is difficult to form the yoke with high accuracy, and circumferential undulations could form on the attracting surface of the attracting portion of the yoke, thus deteriorating the flatness of the attracting surface. This results in variations in contact surface area between the pressure receiving plate and the attracting portion from one power transmission device to another, which in turn results in variations in attracting force between the yoke and the pressure receiving plate, and thus variations in negative pressure when switching the drive mode, from one power transmission device to another.

An object of the present invention is to provide a power transmission device for vehicles of which the selective rotation transmission mechanism for keeping the current drive mode can operate stably.

SUMMARY OF THE INVENTION

In order to achieve the above object, the present invention provides a power transmission device comprising: a shaft extending along a center axis, and configured to be rotated about the center axis under a driving force from a driving source; a slide gear rotatable about the center axis in unison with the shaft, and movable in the direction of the center axis relative to the shaft; a hub having an outer gear integral with or fixed to the hub, the outer gear being engageable with the slide gear, wherein the hub is configured to rotate about the center axis in unison with a wheel; and a selective rotation transmission mechanism configured to move the slide gear relative to the shaft in the direction of the center axis, into and out of engagement with the outer gear so as to selectively allowing and blocking transmission of rotation between the shaft and the hub, the selective rotation transmission mechanism including a yoke which is magnetized, and an attracted member opposed to the yoke in the direction of the center axis, wherein the yoke and the attracted member are configured such that, when the attracted member is attracted to the yoke, at least one separated region is defined between the yoke and the attracted member such that at the separated region, the attracted member is out of contact with the yoke.

By defining the at least one separated region where the yoke and the attracted member are not in contact with each other, the yoke attracts the attracted member only at its portions where there is no separated region. This reduces variations in contact surface area even if the attracting surface of the attracting portion of the yoke has circumferential undulations, thus reducing variations in attracting force from one power transmission device to another. As a result, it is possible to improve the stability of operation of the selective rotation transmission mechanism for maintaining the current drive mode.

Preferably, the separated region is defined by protrusions on the surface of the yoke facing the attracted member, or by protrusions on the surface of the attracted member facing the yoke. With either of these arrangements, simply by determining the widths and heights of the protrusions, a separated region (or gap) having a desired width and circumferential length can be defined easily. This reliably improves stability of operation of the selective rotation transmission mechanism while ensuring sufficient force with which the attracted member is attracted to the yoke.

Preferably, the at least one separated region comprises a plurality of separated regions. By defining three separated regions, the yoke can attract the attracted member stably, thus further improving stability of operation of the selective rotation transmission mechanism.

With the power transmission device according to the present invention, since the selective rotation transmission mechanism for selectively allowing and blocking transmission of rotation between the shaft and the hub is configured such that at least one separated region is defined between the yoke and the attracted member, even if the attracting surface of the attracting portion of the yoke has circumferential undulations formed when forming the yoke, the yoke can stably attract the attracted member with minimum variations in attracting force from one power transmission device to another. This improves stability of operation of the selective rotation transmission mechanism for maintaining the current drive mode of the vehicle.

DETAILED DESCRIPTION OF THE INVENTION

Figure 1:
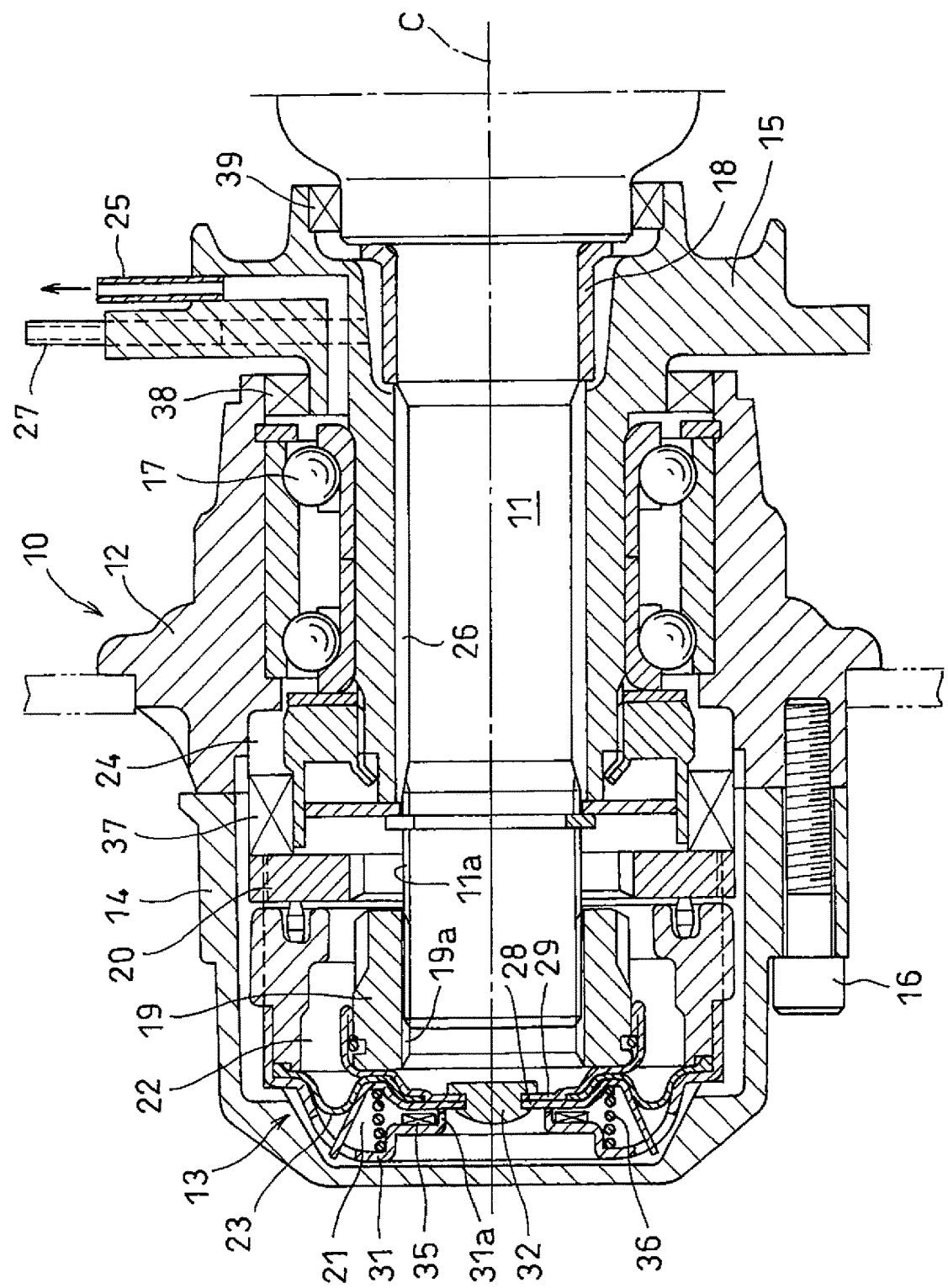
FIG. 1 is a sectional view of a power transmission device embodying the present invention.

FIGS. 1 and 3-7 show a power transmission device 10 embodying the present invention. By way of example, two such power transmission devices 10 are used in a vehicle 50 shown in FIG. 2. The vehicle 50 shown in FIG. 2 includes an engine 1; a transmission 2; a transfer case 5 capable of switching between a two-wheel drive mode and a four-wheel drive mode by actuating a switching mechanism 4 through a transfer case lever 3; and wheels 9a and 9b.

During the two-wheel drive mode, driving force is transmitted from the transfer case 5 to the rear wheels 9b through a rear propeller shaft 6b, a rear differential 7b, and rear axles 8b, while the switching mechanism 4 blocks transmission of the driving force from the transfer case 5 to a front propeller shaft 6a. During the four-wheel drive mode, the driving force transmitted to the transfer case 5 is partially transmitted to the rear wheels 9b, and partially transmitted to the front wheels 9a through a front propeller shaft 6a, a front differential 7a, and the respective power transmission devices 10.

Figure 2:
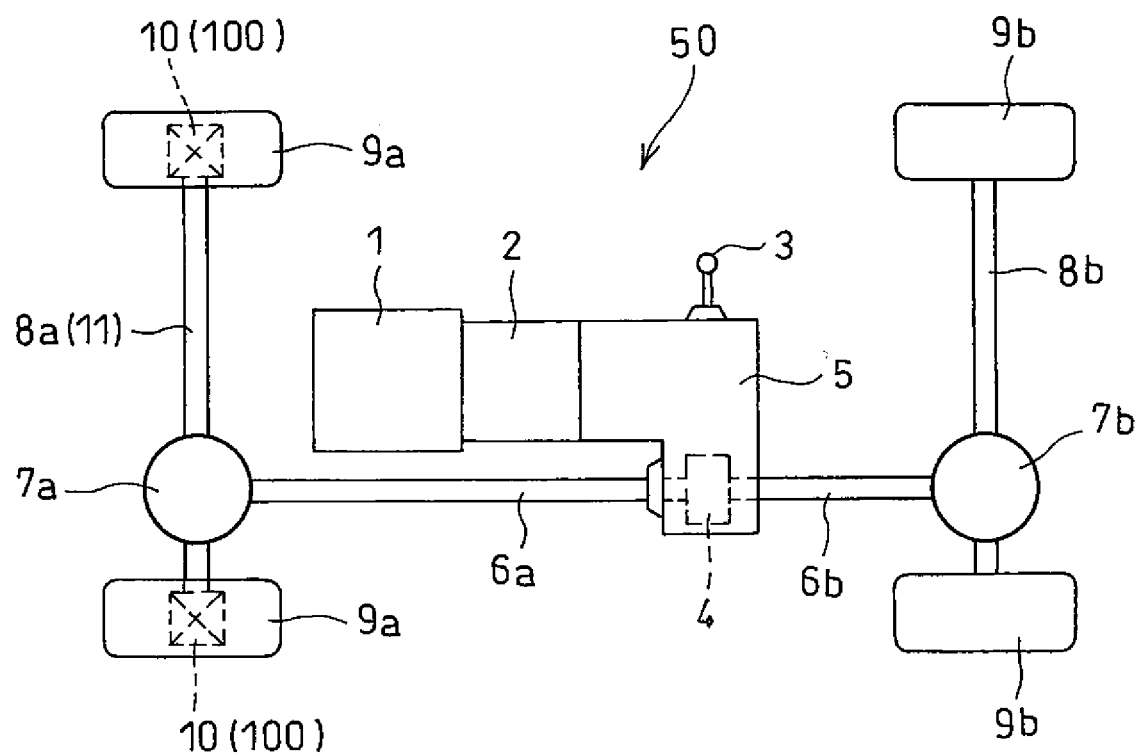
FIG. 2 illustrates an entire structure of a vehicle including power transmission devices as shown in FIG. 1.

As shown in FIG. 1, each power transmission device 10 of the vehicle 50 includes, as main components, a shaft 11 (which constitutes a front axle 8a of the vehicle 50) extending along a center axis C and configured to be rotated about the center axis C by the driving force from the engine or driving source 1; a hub 12 configured to rotate about the center axis C together with the wheel 9a; and a selective rotation transmission mechanism 13 configured to selectively allow and block transmission of rotation between the shaft 11 and the hub 12. The shaft 11 and the selective rotation transmission mechanism 13 are received within the hub 12, a cover 14 fixed to the hub 12, and a spindle 15. The shaft 11 includes a bush 18 so that the shaft 11 is smoothly rotatable relative to the spindle 15. The hub 12 and the cover 14 are fixedly fastened to each other by bolts 16. A bearing 17 is disposed between the hub 12 and the spindle 15 so that the hub 12 and the spindle 15 are rotatable about the center axis C relative to each other.

A slide gear 19 is mounted to the shaft 11, and the shaft 11 has guide grooves 11a which axially guide the slide gear 19 by guiding its guide projections 19a. Thus, the slide gear 19 is movable in the axial direction relative to the shaft 11, and is rotatable about the center axis C in unison with the shaft 11. An outer gear 20 which is engageable with the slide gear 19 is integral with or fixed to the hub 12 so as to be rotatable about the center axis C in unison with the hub 12.

The selective rotation transmission mechanism 13 is configured to axially move the slide gear 19 relative to the shaft 11 into and out of engagement with the outer gear 20, thereby selectively allowing and blocking transmission of rotation between the shaft 11 and the hub 12.

The selective rotation transmission mechanism 13 defines an internal space which is divided by a diaphragm 23 into a two-wheel drive negative pressure chamber 21 in which negative pressure is selectively created to move the slide gear 19 out of engagement with the outer gear 20, and a four-wheel drive negative pressure chamber 22 in which negative pressure is selectively created to move the slide gear 19 into engagement with the outer gear 20.

Seal members 37, 38 and 39 are disposed, respectively, on the outer peripheral edge of the outer gear 20, between the hub 12 and the spindle 15, and between the shaft 11 and the spindle 15 to keep the negative pressure chambers 21 and 22 airtight.

The two-wheel drive negative pressure chamber 21 is connected to a two-wheel drive negative pressure port 25 through a two-wheel drive negative pressure passage 24, whereas the four-wheel drive negative pressure chamber 22 is connected to a four-wheel drive negative pressure port 27 through a four-wheel drive negative pressure passage 26. Timer-controlled shut-off valves (not shown) are disposed in the two-wheel drive negative pressure passage 24 and the four-wheel drive negative pressure passage 26, respectively. Each shut-off valve is configured to be activated when a predetermined time set by a timer has passed after negative pressure is created in the corresponding one of the two-wheel drive negative pressure passage 24 and the four-wheel drive negative pressure chamber 26, so as to bring the corresponding one of the two-wheel drive negative pressure chamber 21 and the four-wheel drive negative pressure chamber 22 into communication with the atmosphere.

Figure 3:
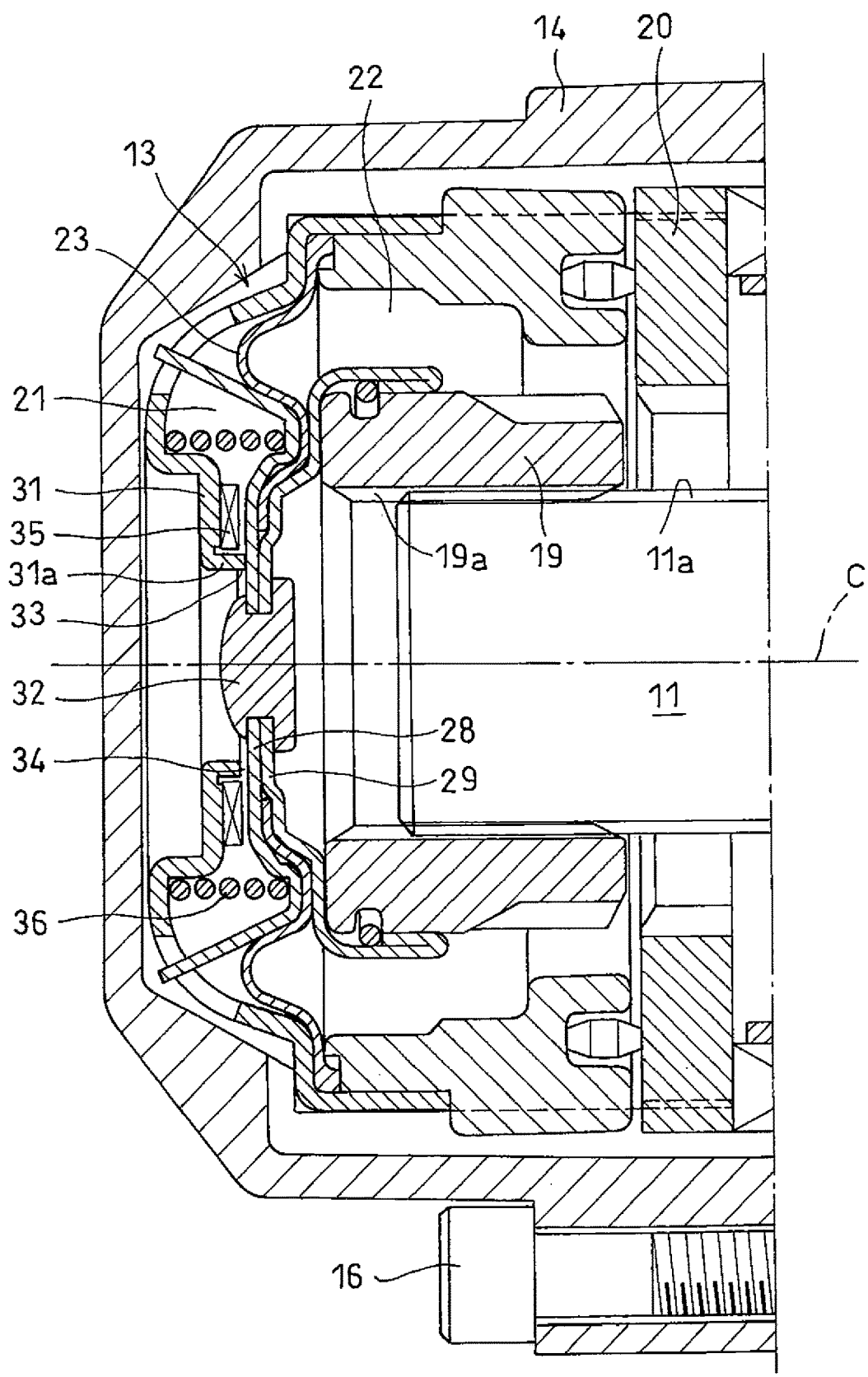
FIG. 3 is a partial sectional view of the power transmission device of FIG. 1, while the vehicle is in a two-wheel drive mode.
Figure 4:
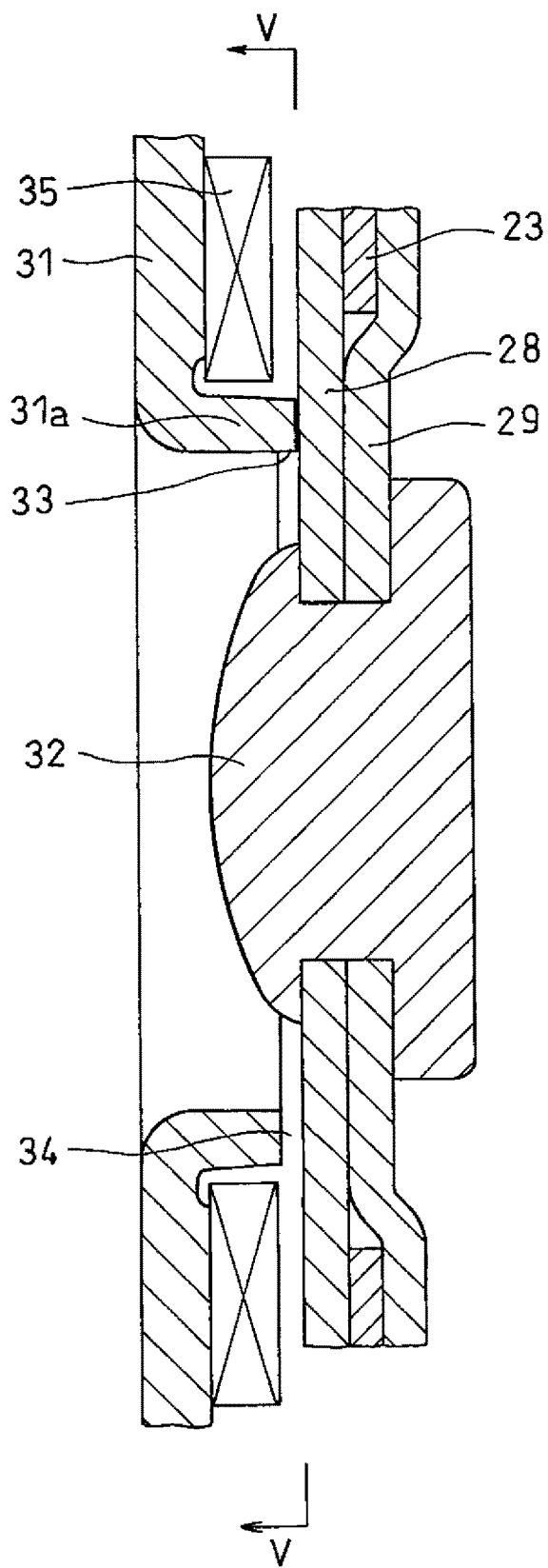
FIG. 4 is an enlarged view of a portion of FIG. 3 including a yoke.

Referring to FIGS. 1, 3 and 4, a pressure receiving plate 28 is disposed on the side of the diaphragm 23 facing the two-wheel drive negative pressure chamber 21, whereas a piston 29 is disposed on the side of the diaphragm 23 facing the four-wheel drive negative pressure chamber 22. The pressure receiving plate 28 is axially disposed between, and axially opposed to, a yoke 31, which is to be described later, and the piston 29. The pressure receiving plate 28 is configured to be attracted to the yoke 31 when the slide gear 19 disengages from the outer gear 20. The slide gear 19 is fixed to the piston 29 so that, as the piston 29 moves in the axial direction, the slide gear 19 also moves in the axial direction.

The diaphragm 23, the pressure receiving plate 28, and the piston 29 are fixed together by a rivet 32 so as to move axially together with the rivet 32.

Figure 5:
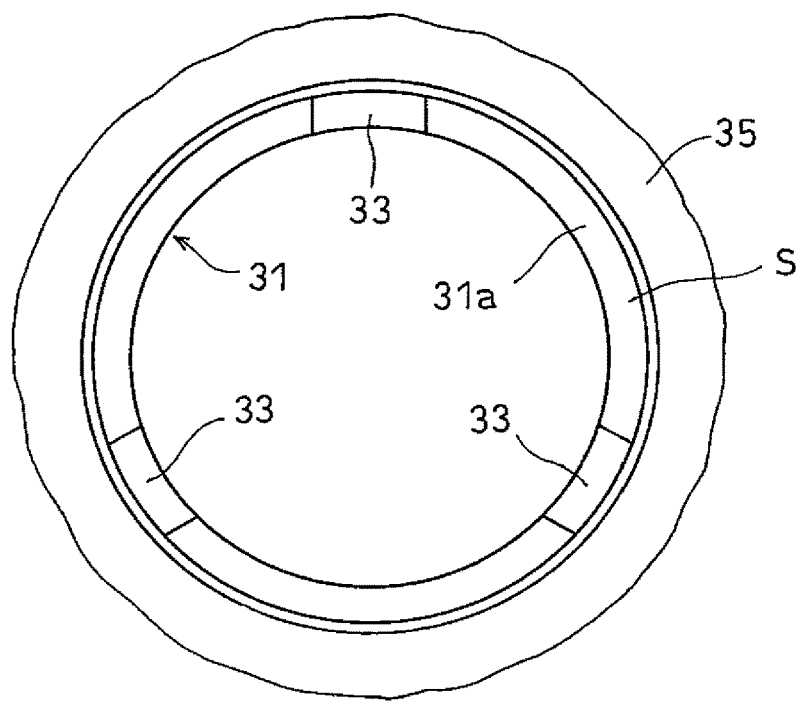
FIG. 5 is a view taken along line V-V of FIG. 4.
Figure 6:
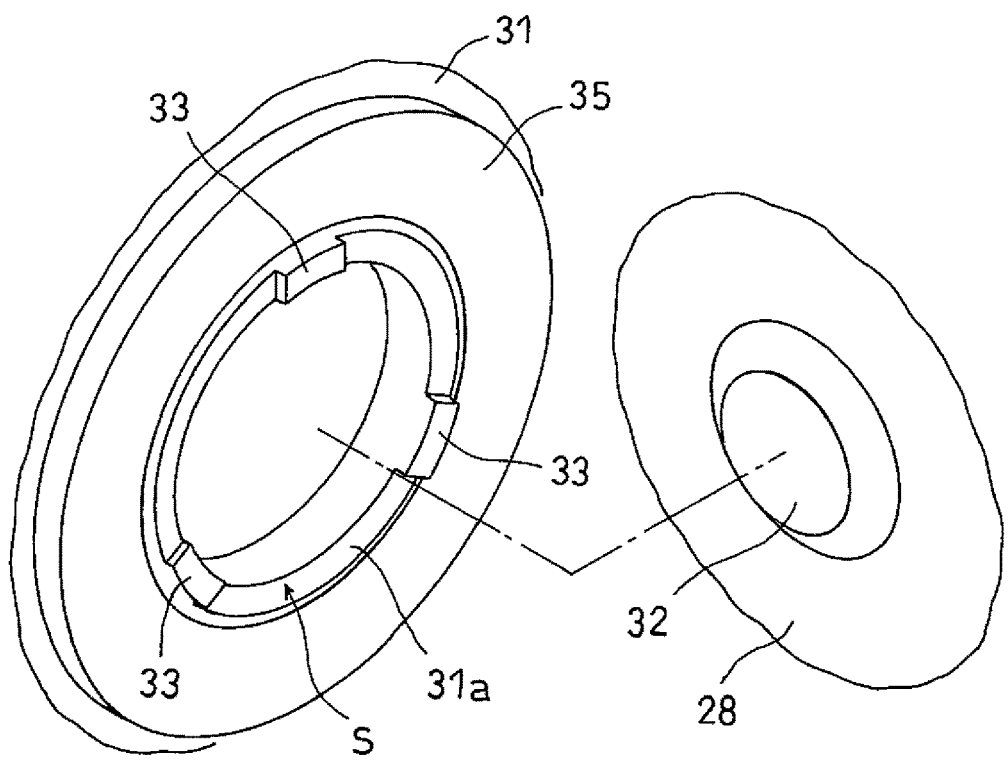
FIG. 6 is an enlarged perspective view of a portion of the yoke, shown in FIG. 1, including its attracting portion, and a portion of an attracted member shown in FIG. 1.

The yoke 31 is fixed in position within the cover 14, and made of a magnetic material so as to be magnetized by a magnet 50. The yoke 31 includes a cylindrical attracting portion 31a protruding from the radially inner edge of the yoke 31 toward the pressure receiving plate 28. As shown in FIGS. 5 and 6, the attracting portion 31a has, on its axial distal end surface (surface S axially facing the pressure receiving plate 28), a plurality of protrusions 33 arranged at predetermined angular intervals. In the embodiment, the plurality of protrusions 33 of the attracting portion 31a comprise three protrusions arranged at angular intervals of 120 degrees. By the provision of the protrusions 33, as shown in FIG. 4, when the pressure receiving plate 28 is attracted to (the attracting portion 31a of) the yoke 31, separated regions 34 (spaces) are defined between the yoke 31 and the pressure receiving plate 28 at angular intervals of 120 degrees such that the portions of (the surface S of) the attracting portion 31a where there are no protrusions 33 are out of contact with the pressure receiving plate 28.

Between the yoke 31 and the pressure receiving plate 28, a biasing member 36 comprising a coil spring is disposed which is configured to bias the pressure-receiving plate 28 (and thus the diaphragm 23 and the piston 29 too) in the direction away from the yoke 31. The slide gear 19 is attached to the radially outer edge of the piston 29 so that, as the piston 29 moves in the axial direction, the slide gear 19 moves in the same direction together with the piston 29.

When negative pressure is created in the two-wheel drive negative pressure chamber 21, as shown in FIG. 3, the diaphragm 23 moves toward the two-wheel drive negative pressure chamber 21 until the slide gear 19 moves out of engagement with the outer gear 20, so that the power transmission device 10 is switched to the two-wheel drive mode, in which no rotation can be transmitted between the shaft 11 and the hub 12. When a predetermined time has passed after switching to the two-wheel drive mode, the timer-controlled shut-off valve in the two-wheel drive negative pressure passage 24 is actuated to bring the two-wheel drive negative pressure chamber 21 into communication with the atmosphere. Even though the negative pressure disappears in the two-wheel drive negative pressure chamber 21, since the pressure receiving plate 28 remains magnetically attracted to the attracting portion 31a of the magnetized yoke 31, the two-wheel drive mode is maintained by this magnetic attraction force alone.

Figure 7:
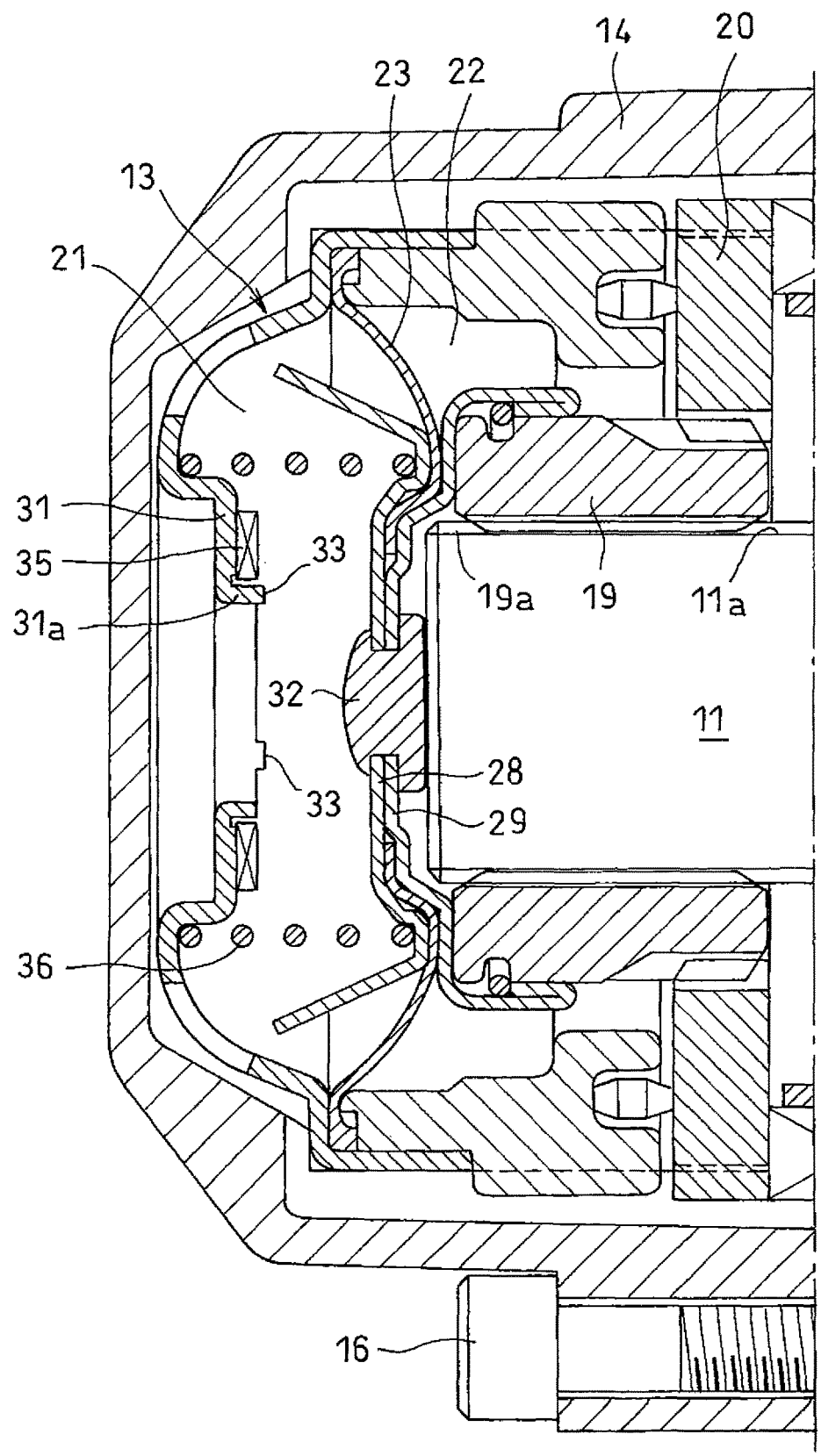
FIG. 7 is a sectional view of the power transmission device of FIG. 1 while the vehicle is in a four-wheel drive mode.

When negative pressure is created in the four-wheel drive negative pressure chamber 22, as shown in FIG. 7, the diaphragm 23 moves toward the four-wheel drive negative pressure chamber 22 until the slide gear 19 engages the outer gear 20, so that the power transmission device 10 is switched to the four-wheel drive mode, in which rotation can be transmitted from the shaft 11 to the hub 12. When a predetermined time has passed after switching to the four-wheel drive mode, the timer-controlled shut-off valve in the four-wheel drive negative pressure passage 26 is actuated to bring the four-wheel drive negative pressure chamber 22 into communication with the atmosphere. Even though the negative pressure disappears in the four-wheel drive negative pressure chamber 22, the four-wheel drive mode is maintained by the biasing force of the coil spring 36 alone.

The above-described power transmission devices 10 of the vehicle 50 provide the following advantages.

Since each power transmission device 10 is configured such that, when the pressure receiving plate 28 is attracted to the yoke 31 having the protrusions 33, separated regions 34 are defined at angular intervals of 120 degrees between the yoke 31 and the pressure receiving plate 28 such that at the separated regions 34, the pressure receiving plate 28 is out of contact with the yoke 31, the contact surface area of the attracting portion 31a of the yoke 31 is sufficiently large irrespective of the accuracy with which the yoke 31 and the pressure receiving plate 28 are formed, so that variations in the magnetic attraction force of the attracting portion 31a is small. This improves the stability of operation of the selective rotation transmission mechanism for keeping the current drive mode of the vehicle 50.

It may be considered that by defining the separated regions 34 between the yoke 31 and the pressure receiving plate 28, the attracting force may decrease because the contact surface area between the yoke 31 and the pressure receiving plate 28 decreases. Actually, however, since the magnetic flux density increases at contact portions between the yoke 31 and the pressure receiving plate 28, by properly adjusting the air gaps (axial spaces) of the separated regions 34, it is possible to generate substantially the same attraction force as when the separated regions are not defined. The size of the air gaps can be altered by changing the heights of the protrusions 33 on the yoke 31.

By defining three such separated regions 34, the yoke 31 can more stably attract the pressure receiving plate 28, which further improves the stability of operation of the selective rotation transmission mechanism 13.

Since, after the drive mode has been switched to the two-wheel drive mode (FIG. 3) or to the four-wheel drive mode (FIG. 7), the two-wheel drive negative pressure chamber 21 or the four-wheel drive negative pressure chamber 22 is opened to the atmosphere, it is possible to prevent deterioration of the seal members 37, 38 and 39, and prevent muddy water from being sucked into the device 10 due to the negative pressure.

In the embodiment, three separated regions 34 are defined by the three protrusions 33 on the attracting surface 31a, but the number of separated regions (or region) is not limited to three.

Figure 8:
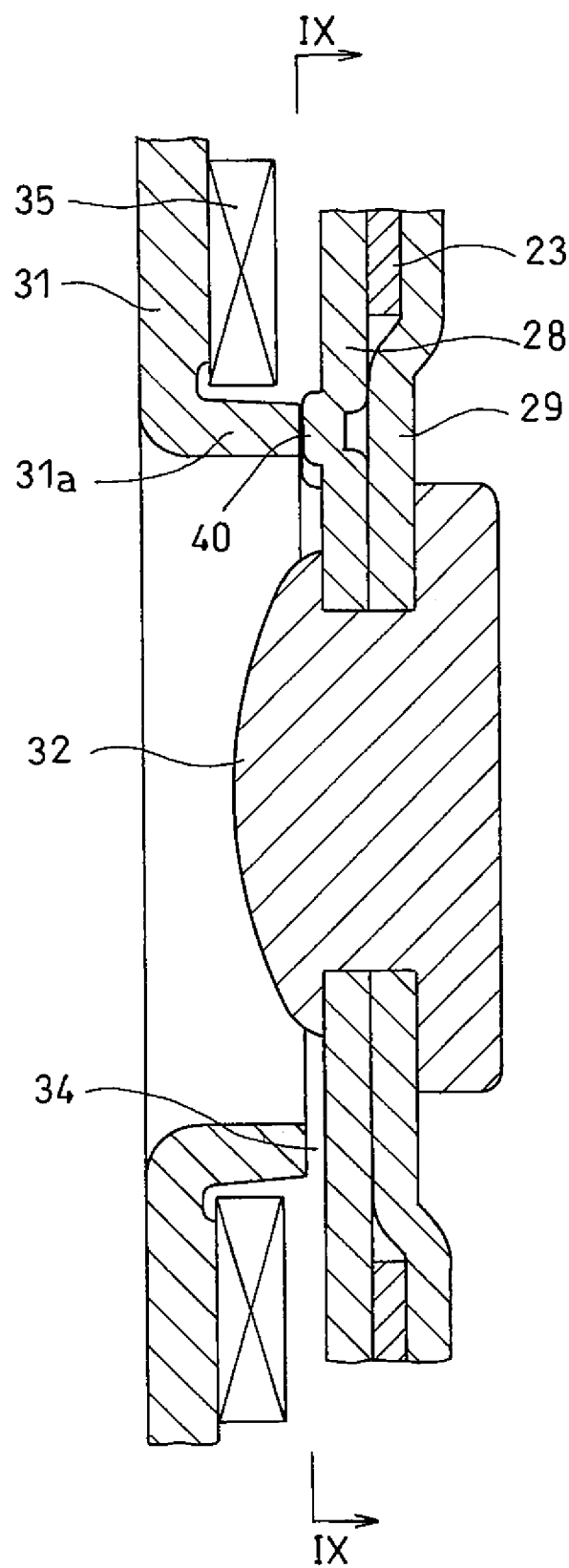
FIG. 8 is a view similar to FIG. 1 and illustrating a modification of the power transmission device of FIG. 1.
Figure 9:
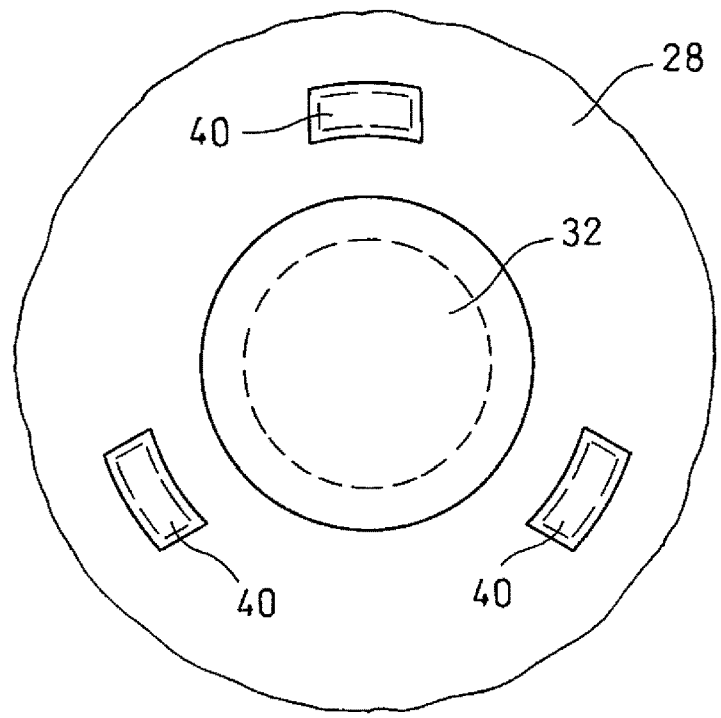
FIG. 9 is a view taken along line IX-IX of FIG. 8.
Figure 10:
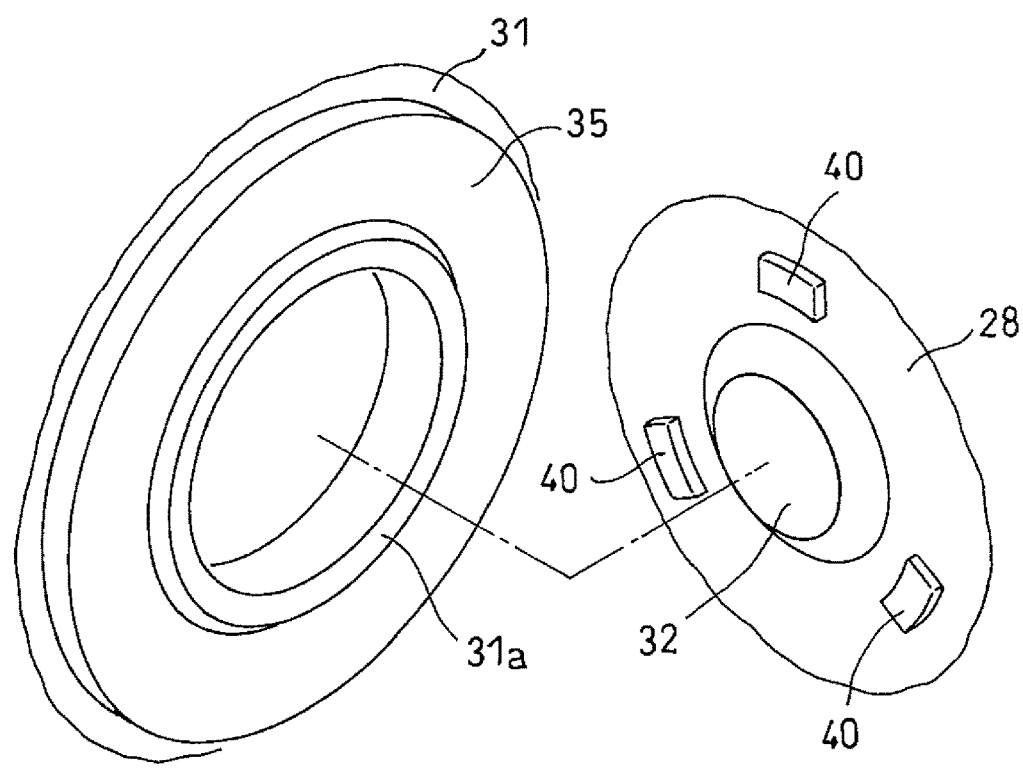
FIG. 10 is an enlarged perspective view of a portion of a yoke shown in FIG. 8 including its attracting portion, and a portion of an attracted member shown in FIG. 8.
Figure 11:
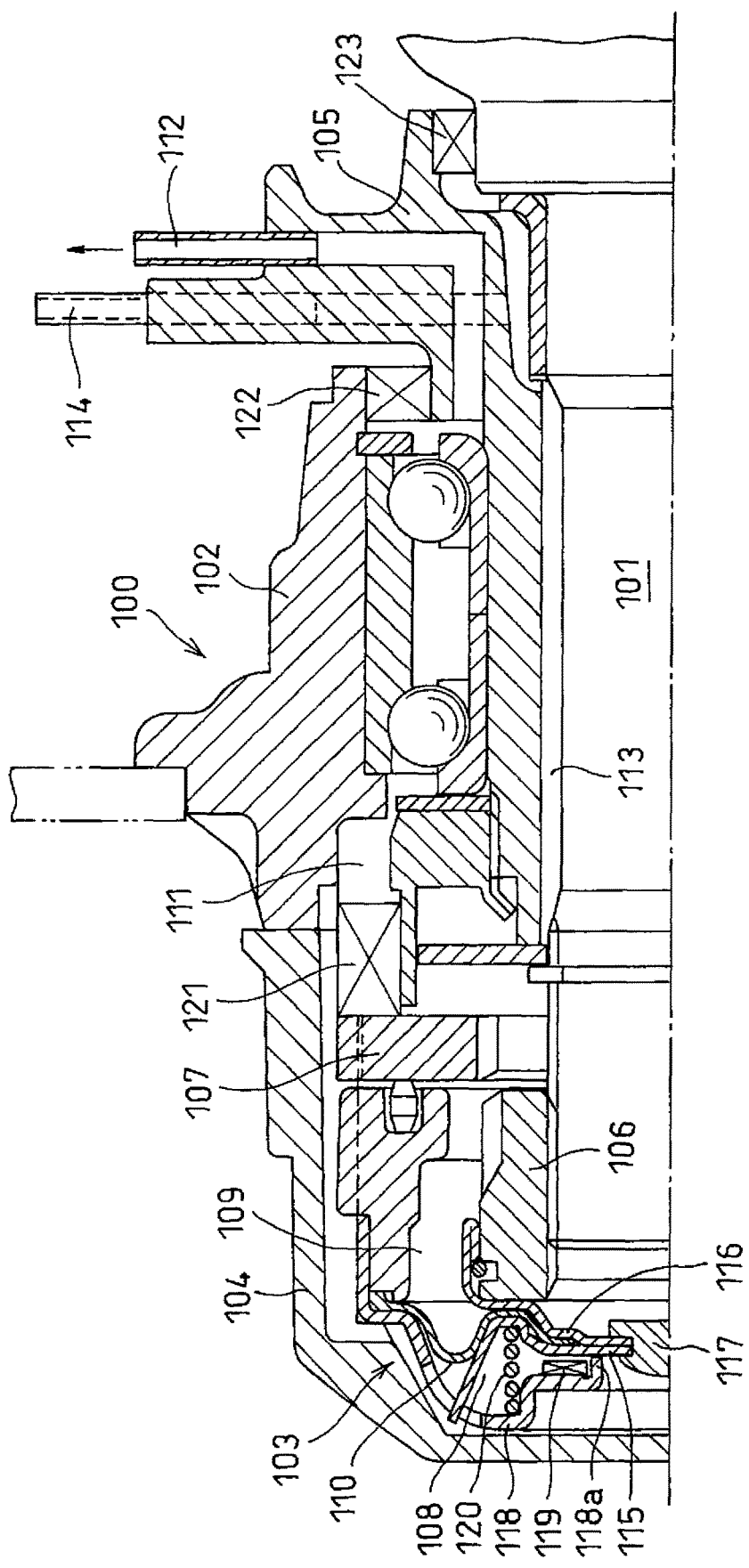
FIG. 11 is a sectional view of a conventional power transmission device while in a two-wheel drive mode.
Figure 12:
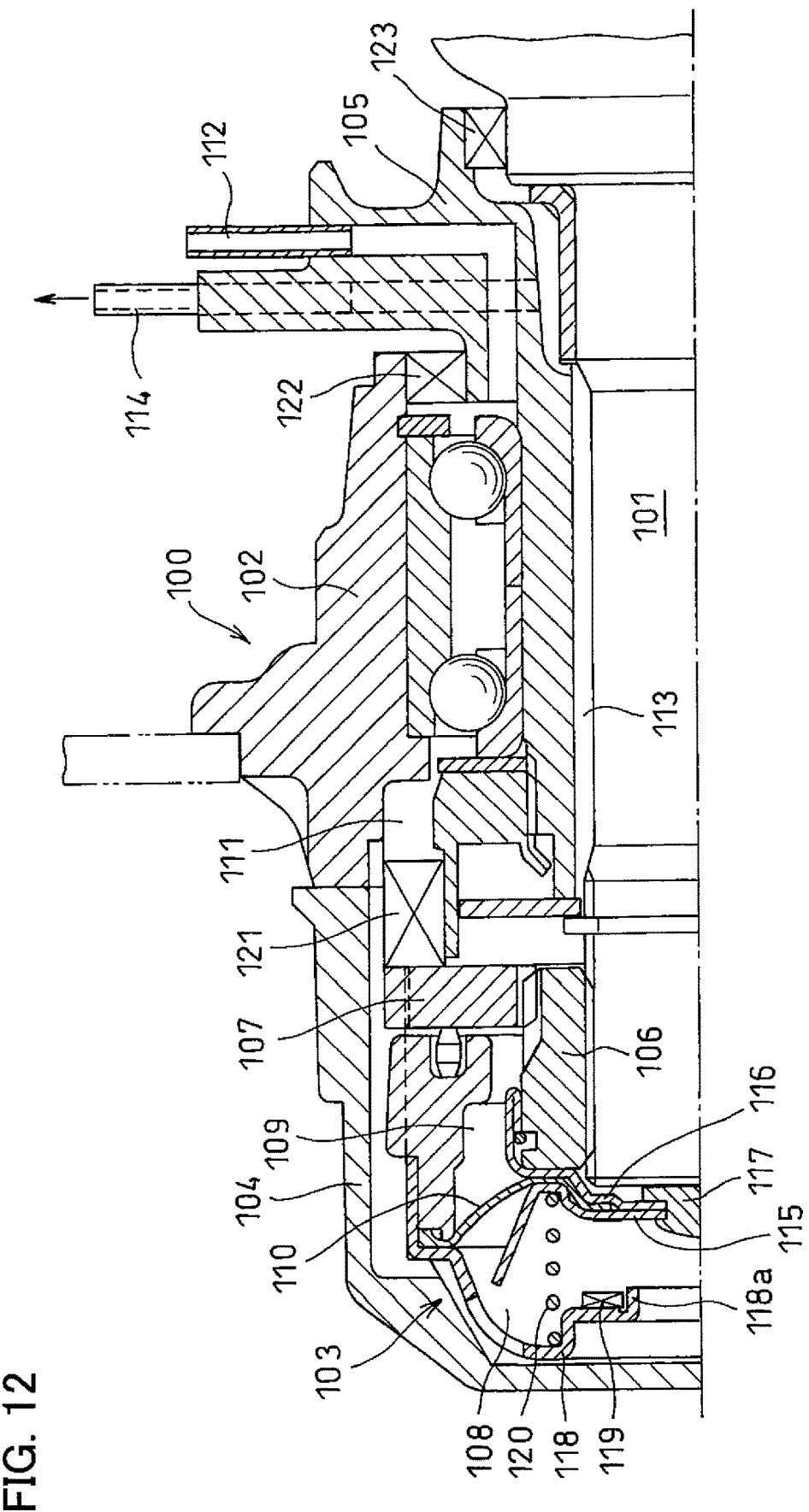
FIG. 12 is a sectional view of the conventional power transmission device of FIG. 11 while in a four-wheel drive mode.
Figure 13:
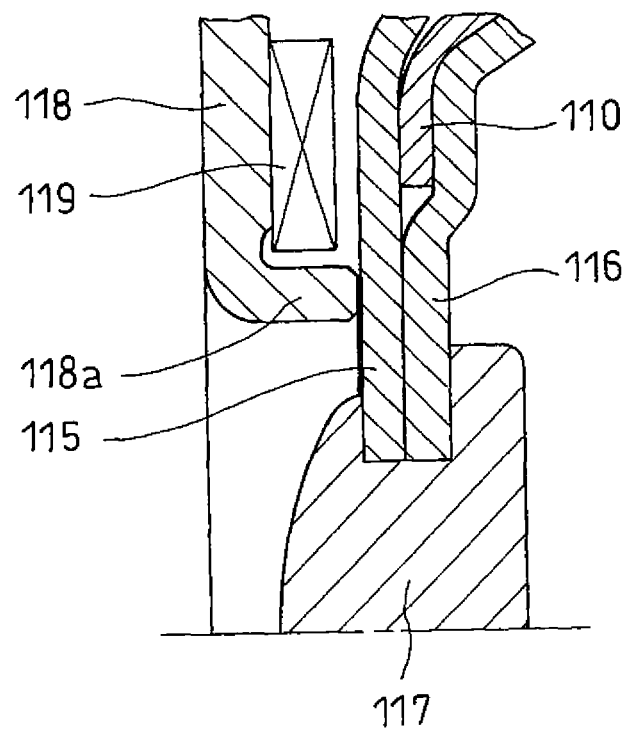
FIG. 13 is a portion of FIG. 11.

In the embodiment, the separated regions 34 are defined by the protrusions 33 on the yoke 31, but as shown in FIGS. 8-10, such separated regions 34 may be defined by protrusions 40 on the pressure receiving plate 28. Further alternatively, such separated regions may be defined by protrusions on the yoke and protrusions on the pressure receiving plates. In particular, the separated regions may be defined by attracting the pressure receiving plates to the yoke with the protrusions on the yoke not axially aligned with the protrusions on the pressure receiving plate.

The power transmission device 10 of the embodiment is a mere example, and the shapes, arrangements, etc. of its constituent members may be altered as long as such an altered device can achieve the object of the present invention, i.e., to improve the stability of operation of the selective rotation transmission mechanism for keeping the current drive mode of the vehicle.

DESCRIPTION OF THE REFERENCE NUMERALS AND SYMBOLS

1. Driving source
9 (9a). Wheel (front wheel)
11. Shaft
12. Hub
13. Selective rotation transmission mechanism
19. Slide gear
20. Outer gear
28. Attracting member (pressure receiving plate)
31. Yoke
33. Protrusion (on the yoke)
34. Separated region
35. Magnet
40. Protrusion (on the pressure receiving plate)
C. Center axis

What is claimed is:

1. A power transmission device comprising:
a shaft extending along a center axis, the shaft being configured to be rotated about the center axis under a driving force from a driving source;
a slide gear rotatable about the center axis in unison with the shaft, the slide gear being movable in a direction of the center axis relative to the shaft;
a hub having an outer gear integral with or fixed to the hub, the outer gear being engageable with the slide gear, wherein the hub is configured to rotate about the center axis in unison with a wheel; and
a selective rotation transmission mechanism configured to move the slide gear relative to the shaft in the direction of the center axis, into and out of engagement with the outer gear so as to selectively allow and block transmission of rotation between the shaft and the hub,
wherein the selective rotation transmission mechanism includes a magnetized yoke and an attracted member opposed to the yoke in the direction of the center axis, wherein the yoke and the attracted member are configured such that, when the attracted member is attracted to the yoke, at least one separated region is defined between the yoke and the attracted member such that at the separated region, the attracted member is out of contact with the yoke.

2. The power transmission device of claim 1, wherein the separated region is defined by protrusions on a surface of the yoke facing the attracted member.

3. The power transmission device of claim 2, wherein the separated region is further defined by protrusions on a surface of the attracted member facing the yoke.

4. The power transmission device of claim 3, wherein the at least one separated region comprises a plurality of separated regions.

5. The power transmission device of claim 2, wherein the at least one separated region comprises a plurality of separated regions.

6. The power transmission device of claim 1, wherein the separated region is defined by protrusions on a surface of the attracted member facing the yoke.

7. The power transmission device of claim 6, wherein the at least one separated region comprises a plurality of separated regions.

8. The power transmission device of claim 1, wherein the at least one separated region comprises a plurality of separated regions.

* * * * *